(12) United States Patent
Dizaji et al.

(10) Patent No.: US 8,976,059 B2
(45) Date of Patent: Mar. 10, 2015

(54) IDENTIFICATION AND REMOVAL OF A FALSE DETECTION IN A RADAR SYSTEM

(71) Applicant: Raytheon Canada Limited, Ottawa (CA)

(72) Inventors: Reza M. Dizaji, Waterloo (CA); Anthony M. Ponsford, Ottawa (CA); Richard McKerracher, Waterloo (CA); Emily Wang, Waterloo (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 201 days.

(21) Appl. No.: 13/723,940

(22) Filed: Dec. 21, 2012

(65) Prior Publication Data

US 2014/0176361 A1  Jun. 26, 2014

(51) Int. Cl.
G01S 7/292 (2006.01)
G01S 7/02 (2006.01)
G01S 13/524 (2006.01)
G01S 13/58 (2006.01)

(52) U.S. Cl.
CPC ............ G01S 7/2922 (2013.01); G01S 7/023 (2013.01); G01S 13/5244 (2013.01); G01S 13/5246 (2013.01); G01S 7/2923 (2013.01); G01S 13/582 (2013.01)
USPC ........................................... 342/93; 342/159

(58) Field of Classification Search
CPC .............. G01S 7/2922; G01S 13/5244; G01S 13/5246; G01S 7/023; G01S 13/582; G01S 7/2923
See application file for complete search history.

(56) References Cited

U.S. PATENT DOCUMENTS

| 3,603,998 A | 9/1971 | Kassel |
| 3,618,087 A | 11/1971 | Smith et al. |
| 3,701,989 A | 10/1972 | Calhoon, Sr. et al. |
| 4,170,774 A | 10/1979 | Schaefer |
| 4,404,561 A | 9/1983 | Mulder et al. |
| 4,649,388 A | 3/1987 | Atlas |

(Continued)

FOREIGN PATENT DOCUMENTS

| EP | 0 132 232 | 1/1985 |
| JP | 2009250616 A | * 10/2009 |

(Continued)

OTHER PUBLICATIONS

Li, Y.-C.; Zhang, L.; Liu, B.-C.; Quan, Y.-H.; Xing, M.-D.; Bao, Z., "Stepped-frequency inverse synthetic aperture radar imaging based on adjacent pulse correlation integration and coherent processing," Signal Processing, IET , vol. 5, No. 7, pp. 632,642, Oct. 2011.*

(Continued)

*Primary Examiner* — John B Sotomayor
(74) *Attorney, Agent, or Firm* — Daly, Crowley, Mofford & Durkee, LLP

(57) ABSTRACT

In one aspect, a method to identify and remove a false detection includes receiving a detection from a constant false alarm rate (CFAR) processor, performing a first similarity measure on adjacent coherent integration time values (CITs) corresponding to the detection, performing a second similarity measure on neighbor CITs corresponding to the detection, determining if at least one of the first or second similarity measure is below a threshold and discarding the detection if at least one of the first or second similarity measures is below the threshold.

19 Claims, 9 Drawing Sheets

(56) References Cited

U.S. PATENT DOCUMENTS

| | | | |
|---|---|---|---|
| 4,649,390 | A | 3/1987 | Andrews et al. |
| RE33,152 | E | 1/1990 | Atlas |
| 4,897,664 | A | 1/1990 | Killackey et al. |
| 4,961,075 | A | 10/1990 | Ward |
| 5,093,662 | A | 3/1992 | Weber |
| 5,202,691 | A | 4/1993 | Hicks |
| 5,374,932 | A | 12/1994 | Wyschogrod et al. |
| 5,414,643 | A | 5/1995 | Blackman et al. |
| 5,457,462 | A * | 10/1995 | Mitsumoto et al. ............. 342/93 |
| 5,568,151 | A | 10/1996 | Merritt |
| 5,648,782 | A | 7/1997 | Albo et al. |
| 5,729,465 | A | 3/1998 | Barbaresco |
| 5,784,403 | A | 7/1998 | Scott |
| 5,786,788 | A | 7/1998 | Schober et al. |
| 5,901,059 | A | 5/1999 | Tao et al. |
| 5,909,189 | A | 6/1999 | Blackman et al. |
| 5,982,320 | A | 11/1999 | Simpson et al. |
| 6,130,638 | A | 10/2000 | Winter et al. |
| 6,243,037 | B1 | 6/2001 | Pulford et al. |
| 6,260,759 | B1 | 7/2001 | Nguyen et al. |
| 6,278,401 | B1 | 8/2001 | Wigren |
| 6,292,136 | B1 | 9/2001 | Egnell |
| 6,363,107 | B1 | 3/2002 | Scott |
| 6,377,204 | B1 | 4/2002 | Wurman et al. |
| 6,420,997 | B1 | 7/2002 | Cong |
| 6,567,037 | B1 | 5/2003 | Fung et al. |
| 6,618,324 | B1 | 9/2003 | Lane |
| 6,704,692 | B1 | 3/2004 | Banerjee et al. |
| 6,717,545 | B2 * | 4/2004 | Dizaji et al. ................... 342/93 |
| 6,771,209 | B1 * | 8/2004 | Long ............................ 342/93 |
| 6,819,285 | B1 | 11/2004 | Stockman et al. |
| 6,867,731 | B2 | 3/2005 | Dizaji et al. |
| 6,888,493 | B2 | 5/2005 | Driessen et al. |
| 6,993,460 | B2 | 1/2006 | Beadle et al. |
| 7,026,979 | B2 | 4/2006 | Khosla |
| 7,030,809 | B2 | 4/2006 | McCabe et al. |
| 7,095,358 | B2 | 8/2006 | Krikorian et al. |
| 7,193,557 | B1 | 3/2007 | Kovacich et al. |
| 7,218,270 | B1 | 5/2007 | Tamburino |
| 7,333,052 | B2 | 2/2008 | Maskell |
| 7,499,571 | B1 | 3/2009 | Han et al. |
| 7,626,535 | B2 | 12/2009 | Ding et al. |
| 2003/0174088 | A1 * | 9/2003 | Dizaji et al. ................... 342/93 |
| 2003/0210179 | A1 | 11/2003 | Dizaji et al. |
| 2008/0111730 | A1 | 5/2008 | Ding et al. |
| 2008/0129582 | A1 * | 6/2008 | Hsieh et al. ................... 342/94 |
| 2009/0201195 | A1 * | 8/2009 | Gazelle et al. ................ 342/174 |
| 2013/0088380 | A1 * | 4/2013 | Isoda ............................ 342/109 |
| 2013/0127655 | A1 * | 5/2013 | Kishigami et al. ............. 342/152 |
| 2013/0201054 | A1 * | 8/2013 | Wang et al. ................... 342/93 |
| 2014/0035776 | A1 * | 2/2014 | Sochen et al. ................. 342/107 |
| 2014/0176361 | A1 * | 6/2014 | Dizaji et al. ................... 342/93 |

FOREIGN PATENT DOCUMENTS

| | | |
|---|---|---|
| WO | WO 98/21603 | 5/1998 |
| WO | WO 00/30264 | 5/2000 |
| WO | WO 2006/035041 A1 | 4/2006 |

OTHER PUBLICATIONS

U.S. Appl. No. 10/384,203, filed Mar. 7, 2003, Dizaji, et al.
U.S. Appl. No. 11/756,913, filed Jun. 1, 2007, Ding et al.
U.S. Appl. No. 11/760,188, filed Jun. 8, 2007, Hubbard et al.
U.S. Appl. No. 13/543,989, filed Jul. 9, 2012, Anderson et al.
U.S. Appl. No. 60/363,570, filed Mar. 13, 2002, Dizaji et al.
U.S. Appl. No. 60/365,152, filed Mar. 19, 2002, Dizaji et al.
U.S. Appl. No. 60/857,771, filed Nov. 9, 2006, Ding et al.
"Alaska Wind Turbine Study—Phase 2", Raytheon document, Mar. 2006, 29 pages.
"Feasibility of Mitigating the Effects of Windfarms on Primary Radar", ETSU W/14/00623/REP, DTI PBU URN No. 03/976; Contractor, Alenia Marconi Systems Limited, Prepared by MM. Butler, D.A. Johnson, First Published in Jun. 2003, 208 pages.
"Feasibility of Mitigating the Effects of Windfarms on Primary Radar", Project Summary W/14/00623, Jun. 2003, 4 pages.
"The Effects of Wind Turbine Farms on ATC Radar", Open Report, AWC/WAD/72/665/TRIALS, May 10, 2005, 44 pages.
"Wind Turbines and Radar: Operational Experience and Mitigation Measures", Report to a consortium of wind energy companies, Dec. 2001, Spaven Consulting 2001, 39 pages.
Bar-Shalom et al., Multitarget-Multisensor Tracking: Principles and Techniques, YBS Publishing, © 1995, 623 pages.
Bar-Shalom et al.; "Automatic Track Formation in Clutter With a Recursive Algorithm", Decision and Control, 1989, Proceedings of the 28$^{th}$ IEEE Conference on Dec. 13-15, 1989, pp. 1402-1408, vol. 2.
Bertsekas, The Auction Algorithm 2-D Assignment, Linear Network Optimization, Algorithms and Codes, MIT Press, Cambridge, Massachusetts, USA, © 1991.
Cai et al.; "EM-ML Algorithm for Track Initialization using Possibly Noninformative Data;" IEEE Transactions on Aerospace and Electronic Systems; vol. 41, No. 3, Jul. 2005; pp. 1030-1048.
Ding et al.: "Track Quality Based Multitarget Tracking Algorithm;" slides presented at SPIE Conference on Signal Small Targets, Orlando, FL; Apr. 19, 2006; 17 pages.
Li et al.; "Target Perceivability and Its Applications", Signal Processing, IEEE Transactions on [see also Acoustics, Speech, and Signal Processing, IEEE Transactions on], vol. 49, Issue 11, Nov. 2001, pp. 2588-2604.
PCT International Search Report, PCT/US03/06959, date of mailing Sep. 12, 2003, 3 pages.
Report to the Congressional Defense Committees, "The effect on Windmill Farms on Military Readiness", Office of the Director of Defense Research and Engineering, Jan. 2006, 62 pages.
Ristic; "A Comparison of MHT and 2D Assignment Algorithm for Tracking with an Airborne Pulse Doppler Radar;" 5$^{th}$ Int'l Symposium on Signal Processing and its Applications; ISSPA '99, Brisbane, Australia; Aug. 22-25, 1999, 4 pages.
Sinha et al.; "Track Quality Based Multitarget Tracking Algorithm;" SPIE Conference on Signal and Data Processing of Small Targets (#6236-08), Orlando, FL; Apr. 2006; 12 pages.
Yeom et al., Track Segment Association, Fine-Step IMM and Initialization with Doppler for Improved Track Performance, IEEE Trans. on Aerospace and Electronic Systems, vol. 40, No. 1, pp. 293-309, Jan. 2004.

* cited by examiner

IDENTIFICATION AND REMOVAL OF A FALSE DETECTION IN A RADAR SYSTEM

BACKGROUND

False detections are the consequence of unwanted signals in the radar return. These unwanted signals can be the result of external interference or radar generated clutter. External interference is independent of radar operation and includes noises with different origins and characteristics such as co-channel interference, man-made noises, and impulsive noises, for example. In one phased array radar example, a High Frequency Surface Wave Radar (HFSWR), the radar operates in a frequency band that is shared with many other users so that the phased array radar receives co-channel interference from nearby and far ranges. The external interference has directionality since it originates from spatially correlated sources. However, due to multiple reflections in the non-uniform layers of the Ionosphere, the direction of arrival of the interference can appear to be coming from distributed sources. Radar operation at times of high levels of interference can result in an excessive number of detections that can lead to the generation of false tracks, missed tracks and track seduction.

SUMMARY

In one aspect, a method to identify and remove a false detection includes receiving a detection from a constant false alarm rate (CFAR) processor, performing a first similarity measure on adjacent coherent integration time values (CITs) corresponding to the detection, performing a second similarity measure on neighbor CITs corresponding to the detection, determining if at least one of the first or second similarity measure is below a threshold and discarding the detection if at least one of the first or second similarity measures is below the threshold.

In another aspect, an apparatus includes electronic hardware circuitry to identify and remove a false detection. The circuitry is configured to receive a detection from a constant false alarm rate processor (CFAR), perform a first similarity measure on adjacent coherent integration time values (CITs) corresponding to the detection, perform a second similarity measure on neighbor CITs corresponding to the detection, determine if at least one of the first or second similarity measures is below a threshold and discard the detection if at least one of the first or second similarity measure is below the threshold.

In a further aspect, an article includes a non-transitory medium that stores executable instructions to identify and remove a false detection. The instructions cause a machine to receive a detection from a constant false alarm rate processor (CFAR), perform a first similarity measure on adjacent coherent integration time values (CITs) corresponding to the detection, perform a second similarity measure on neighbor CITs corresponding to the detection, determine if at least one of the first or second similarity measures is below a threshold and discard the detection if at least one of the first or second similarity measure is below the threshold.

DETAILED DESCRIPTION

Described herein are techniques that identify and remove false detections in a radar system. In particular, the techniques described herein remove false detections prior to being sent to a tracker by removing false detections originating from an output of a constant false alarm rate (CFAR) processor prior to a tracker. The techniques are based on a premise that changes in the beam patterns of real targets as function of time and range are slower than changes in the beam patterns of interference and clutter. Therefore, a high degree of correlation indicates that the radar return is from a point target such as a ship, aircraft or natural hazard (e.g., iceberg) for example, and these detections are forwarded to the tracker. A poor degree of correlation indicates that the detection originates from more distributed targets such as noise, clutter and interference and these detections are rejected. The techniques described herein may be used in any radar system.

A radar localizes a target in both range and azimuth (beam). In a High Frequency Surface Wave Radar (HFSWR) returns are received in the form of consecutive updates or coherent integration time values (CITs). Each CIT is the result of accumulation of thousands of radar pulse returns. For example, a typical ship mode CIT is the result of accumulation of 45,000 pulses with a span time of 3 minutes and a pulse repetition frequency (PRF) of 250 Hz. When the beam patterns of a target are observed at two consecutive CITs, the patterns are likely less than a perfect match depending upon the speed of the target. However, if the time difference between two consecutive CITs is reduced to 30 to 50 seconds and assuming a maximum vessel speed in the range of 50 km/h (~834 m/minute or 14 m per second), then the ship target's movement is much less than 1.5 km range resolution/accuracy of the radar. This will make the target look stationary within two consecutive close CITs. For example, when plotting the normalized beam patterns of the target in consecutive close CITs, the beam patterns of the consecutive close CITs appear to match very well. As will be described further herein, a consecutive close CITs differ by a small time difference.

The range accuracy is higher than the range resolution in HFSWR. Therefore, a target appears in more than one range cells. For give a CIT, it can be observed that the normalized beam patterns of a target are very similar at ranges immediately above or below a range of a target.

Figure 1A:
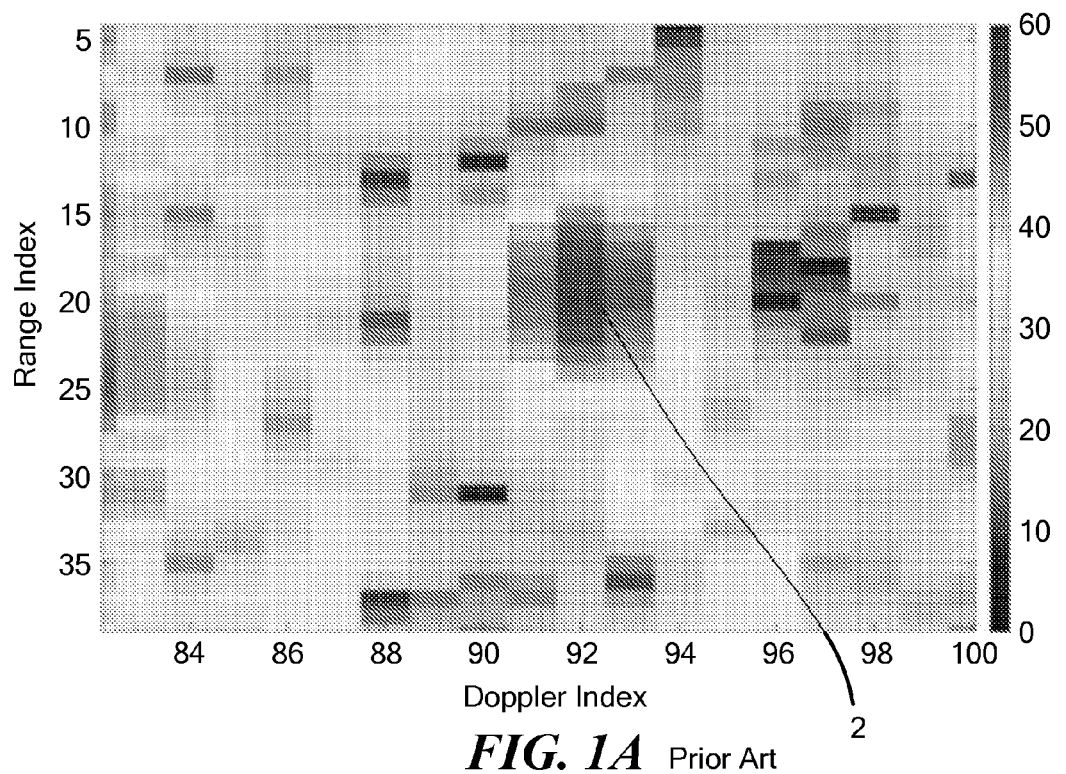
FIG. 1A is a range-Doppler map of an example of a typical real target response.

FIG. 1A is a range-Doppler map of an example of a typical real target response. The range-Doppler map is filled with cells such as a cell 2, for example, which is a cell of a target. Each cell indicates a strength of pulse signal returned.

Figure 1B:
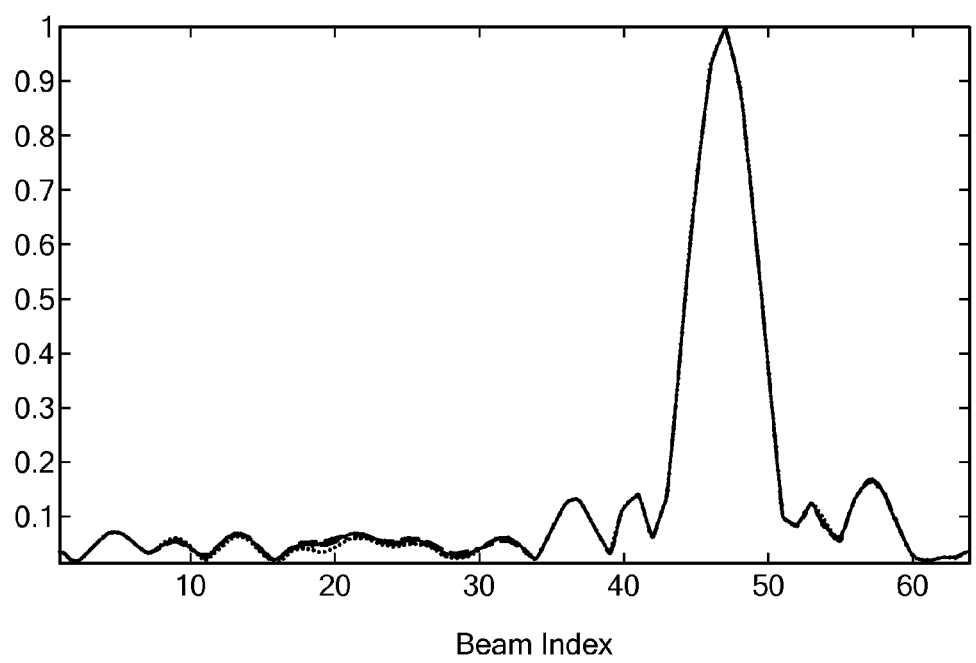
FIG. 1B is a graph of normalized beam patterns in adjacent CITs for the real target in FIG. 1A.

FIG. 1B is a graph of normalized beam patterns for adjacent (e.g., consecutive) CITs. Adjacent CITs include beam patterns at time T, at time T−dt and T+dt for a given cell. Since the normalized beam patterns are for adjacent CITs of a target the beam patterns are nearly identical to each other.

Figure 1C:
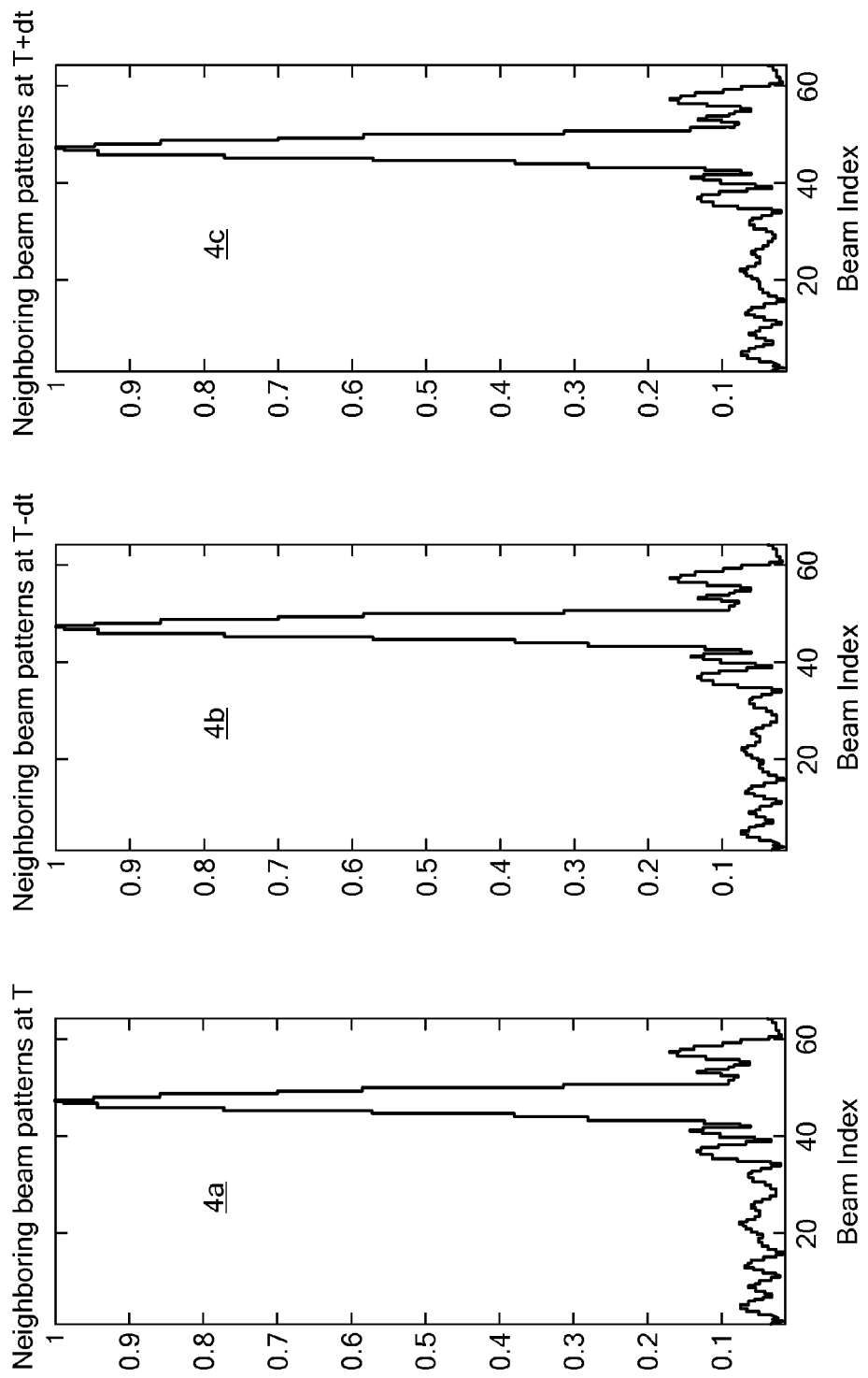
FIG. 1C are graphs of normalized beam pattern in neighboring cells for the real target in FIG. 1A.

FIG. 1C includes graphs of normalized beam patterns for neighboring cells. The graph 4a depicts normalized beam patterns for neighboring cells at time T. The graph 4b depicts normalized beam patterns for neighboring cells at time T−dt. The graph 4c depicts normalized beam patterns for neighboring cells at time T+dt. Each of the beam patterns in graphs 4a-4c are similar within each graph and similar across the graphs which is expected for a real target.

Figure 1D:
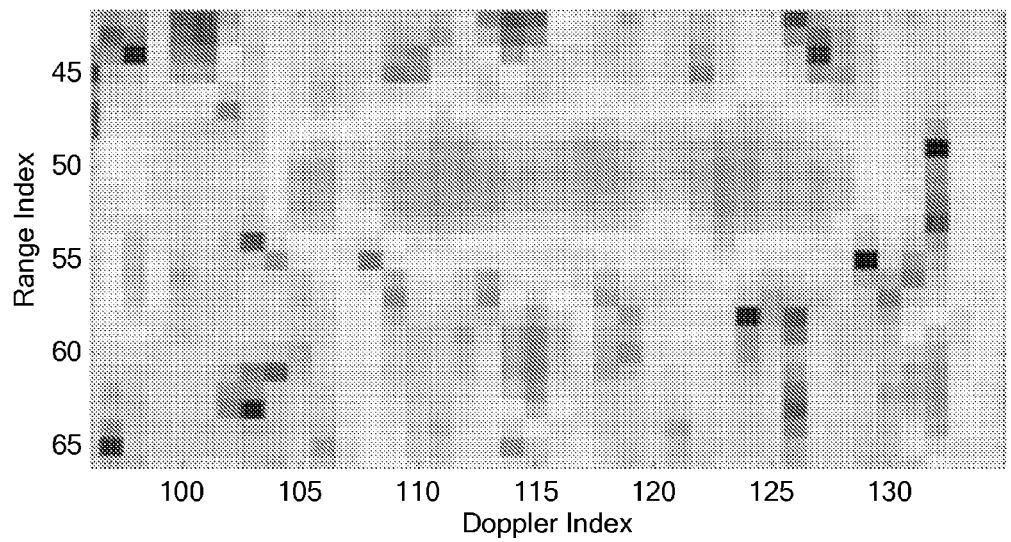
FIG. 1D is a range-Doppler map of an example of a near vertical ionospheric clutter.
Figure 1E:
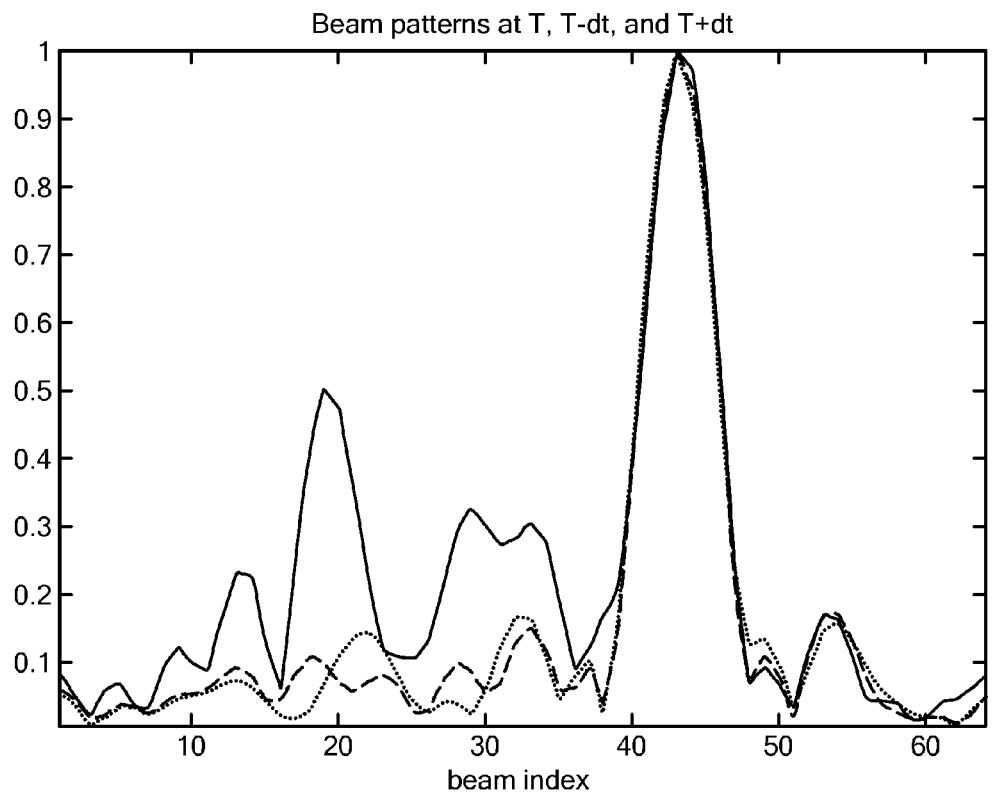
FIG. 1E is a graph of normalized patterns in adjacent CITs for the near vertical ionospheric clutter in FIG. 1D.

FIG. 1D is a range-Doppler map of an example of near vertical ionospheric clutter. FIG. 1E is a graph of normalized beam patterns for adjacent CITs for near vertical ionospheric clutter. None of the beam patterns correlate to each other which is indicative of a false detection.

Figure 1F:
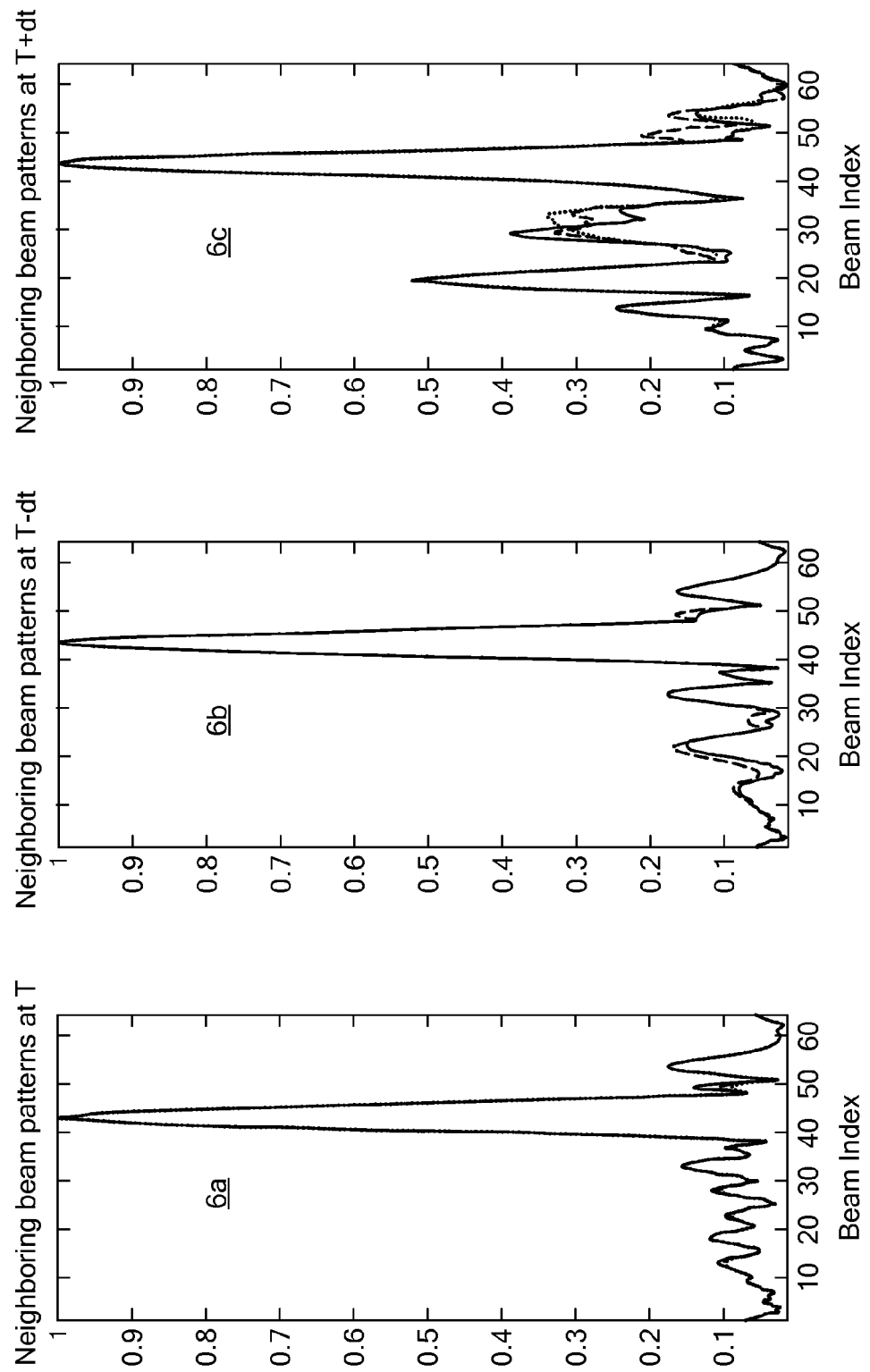
FIG. 1F are graphs of normalized beam pattern in neighboring cells for the near vertical ionospheric clutter in FIG. 1D.

FIG. 1F includes graphs of normalized beam patterns for neighboring cells. The graph 6a depicts normalized beam patterns for neighboring cells at time T. The graph 6b depicts normalized beam patterns for neighboring cells at time T−dt. The graph 6c depicts normalized beam patterns for neighboring cells at time T+dt. Each of the beam patterns in graphs 6a-6c is dissimilar within each graph and dissimilar across the graphs which are indicative of a false detection.

Figure 2A:
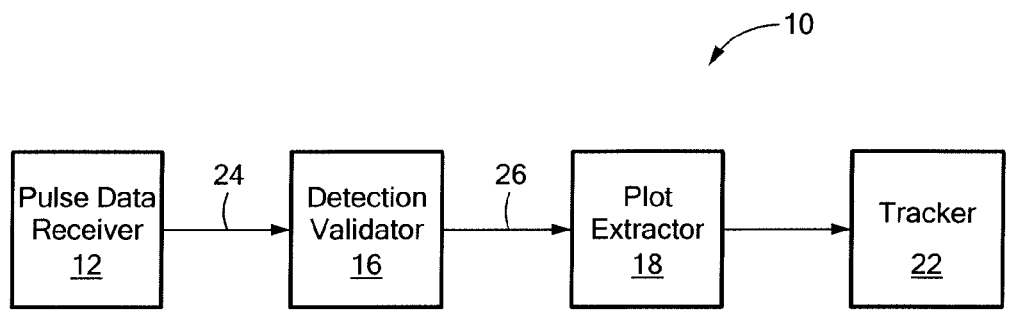
FIG. 2A is a functional block diagram of an example of a system for processing radar data.

Referring to FIG. 2A, a system 10 configured to process radar data includes a pulse data receiver 12, a detection validator 16, a plot extractor 18 and a tracker 22. The pulse data receiver 12 receives pulse data and provides the pulse data to the detection validator 16 through a connection 24. The detection validator 16 identifies and removes false detections and provides validated detections to the plot extractor 18 through a connection 26. The plot extraction 18 provides validated detections to the tracker 22 to track the validated detections.

Figure 2B:
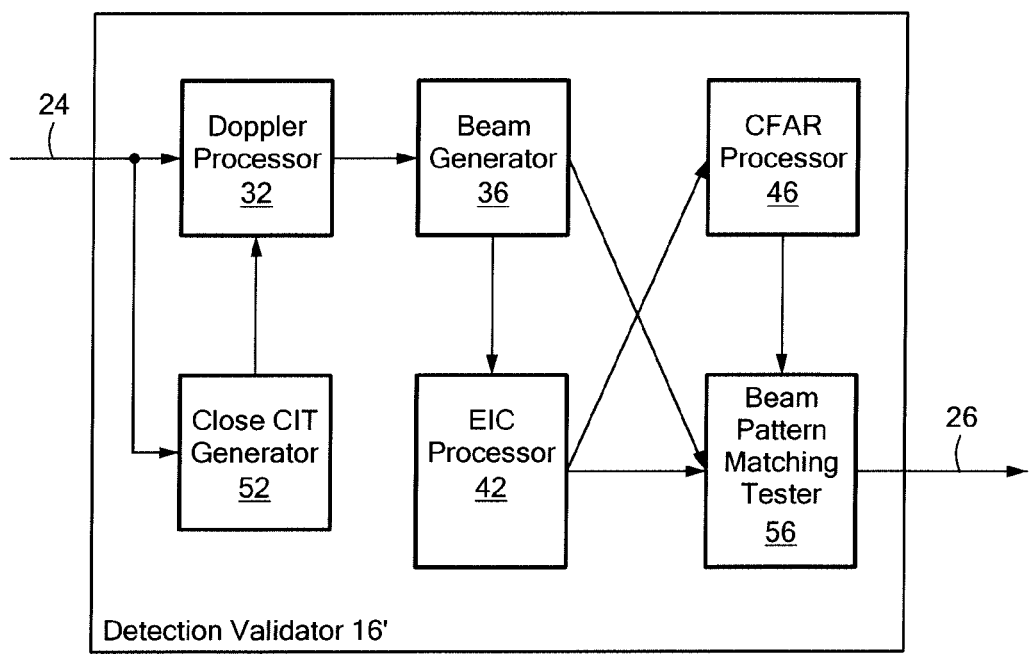
FIG. 2B is a functional block diagram of an example of a detection validator configured to provide validated detections and to identify and remove false detections.

Referring to FIG. 2B, an example of the detection validator 16 is a detection validator 16'. The detection validator 16' includes a Doppler processor 32, a beam generator 36, an external interference cancellation (EIC) processor 42, a constant false alarm rate processor 46, a CIT generator 52 and a beam pattern matching tester 46. The detection validator 16' processes two sets of data. The first set of data is the pulse data. In general, the pulse data comes in the form:

..., CIT(n−2)t, CIT(n−1)t, CIT(n+1)t, CIT(n+2)t, ..., where t is time and n is an integer greater than 0. The second set of data is close CIT data generated from the pulse data by the close CIT generator 52 in the form:

..., CITnt−dt, CITnt, CITnt+dt, ..., where d<<1. dt is s time difference between two close CITs. Larger time differences yield less beam pattern correlation. For real targets, the maximum allowable time difference is a function of a maximum speed of a target. For non-targets, the maximum time difference to yield an identical beam pattern varies for different types of clutter and interference. For ocean clutter and external interference, the time difference is considerably shorter than a target's time difference. For ionospheric clutter and meteor clutter the maximum time difference is not far from a target's maximum time difference.

The detection validator 16' processes the first set of data as follows. Pulsed data is received through the connection 24 and processed by the Doppler processor 32 and by the beam generator 36 to form the beams. From the beam generator 36, the beam data is provided to the EIC processor 36 which removes known external interference.

The EIC processor 36 provides data to the CFAR processor 46 which based on a threshold determines which returns are detections. The output from the EIC processor 36 and the CFAR processor 46 is provided to the beam pattern matching tester 56.

The detection validator 16' process the second set of data as follows. After the close CIT generator 52 generates the close CIT data, the close CIT data is provided to the Doppler processor 32 and to the beam generator 36. After the beam generator 36, the data derived from the close CIT data is provided to the beam pattern matching tester 56.

Using the detections provided by the CFAR processor 46, the CIT data from the EIC processor 42 derived from the first set of data and the close CIT data provided by the beam generator 36 derived from the second set of data, the beam pattern matching tester 56 is able to determine which detections are false and discards them and which detections are valid and sends them on to the plot extraction 18 through the connection 26.

Figure 3:
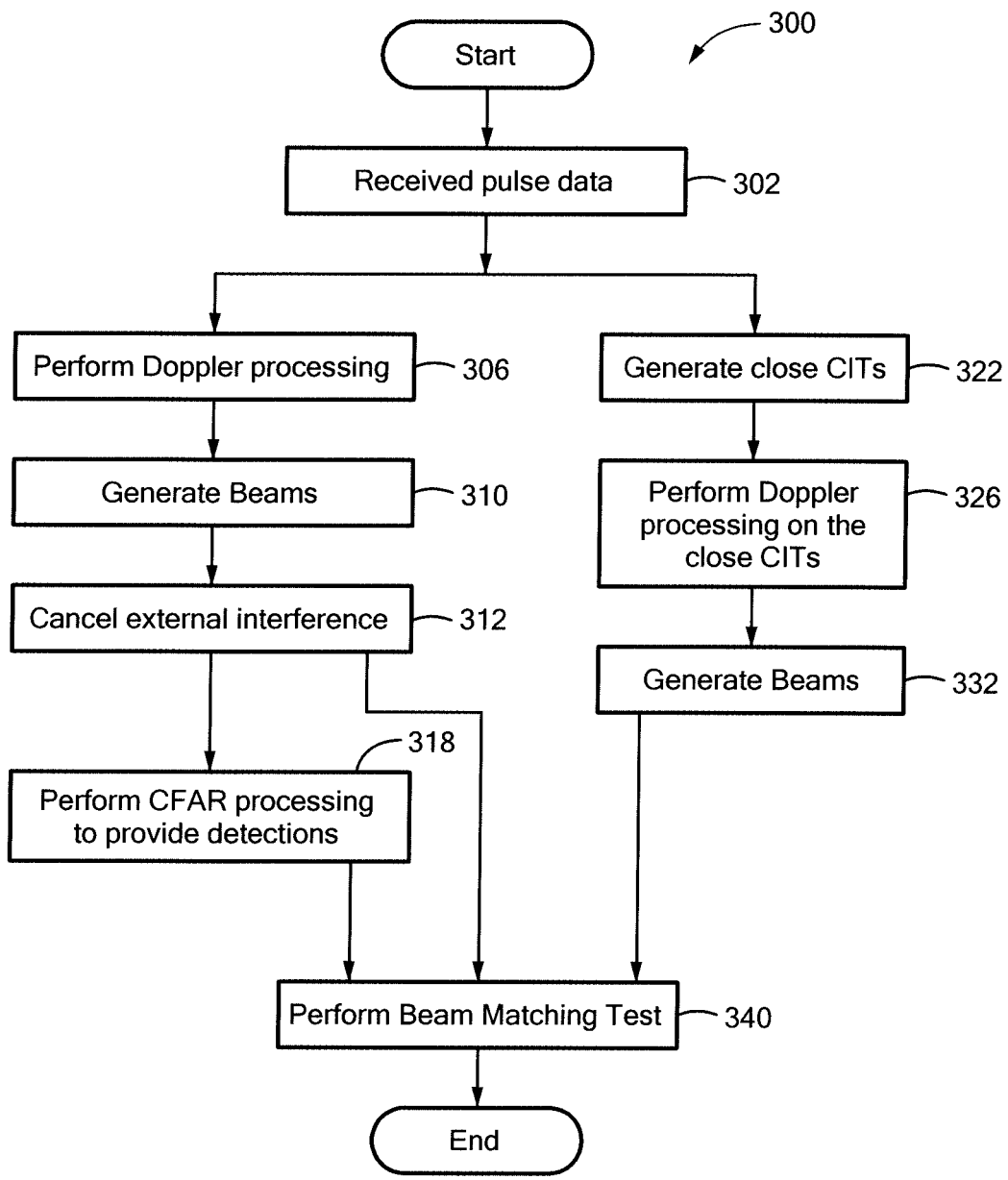
FIG. 3 is a flowchart of an example of a process to validate detections.

Referring to FIG. 3, an example of a process to identify and remove false detections is a process 300. Process 300 receives pulse data (302), performs Doppler processing (306) and generates beams (310). For example, pulse data is received from the pulse data receiver 12 through the connection 24 by the Doppler processor 32. The Doppler processor 32 performs the Doppler processing and the beam generator 36 forms the beams 36.

Process 300 cancels outs any external interference from the beam data (312). For example, the EIC processor 42 cancels out narrow band co-channel interference such as that generated by other users of the spectrum (e.g., communication users).

process 300 performs CFAR processing on the beam data to provide detections (318). For example, the CFAR processor 46 determines, based on a threshold, which of the returns are detections.

Process 300 generates close CITs from the pulse data (322), performs Doppler processing on the close CITs (326) and generates beams from the close CITs (332). For example, pulse data is need by the close CIT generator to generate close CITs. The Doppler processor 32 performs the Doppler processing on the close CITs and the beam generator 36 forms the beams.

Process 300 performs a beam matching test (340) to identify false detections and remove them thereby providing detections that are validated. In one example, the beam matching tester 52 determines if at least one of a first or a second similarity result is below a threshold value and discards the detection. In another example, each similarity measure result is compared to a respective threshold value. If any of the similarity measure results are below their respective threshold the detection is discarded.

The technique described herein allow for the detections of small targets or those targets not previously picked up by CFAR processor 46 due to being close to clutter regions. For example, the techniques described herein significantly reduce the number of false detections which in turn reduce the probability of a false alarm. This allows the detection threshold of the CFAR processor 46 to be set lower to maximize the detection range of small targets without swamping the tracker 22 with a high level of false alarms.

Figure 4:
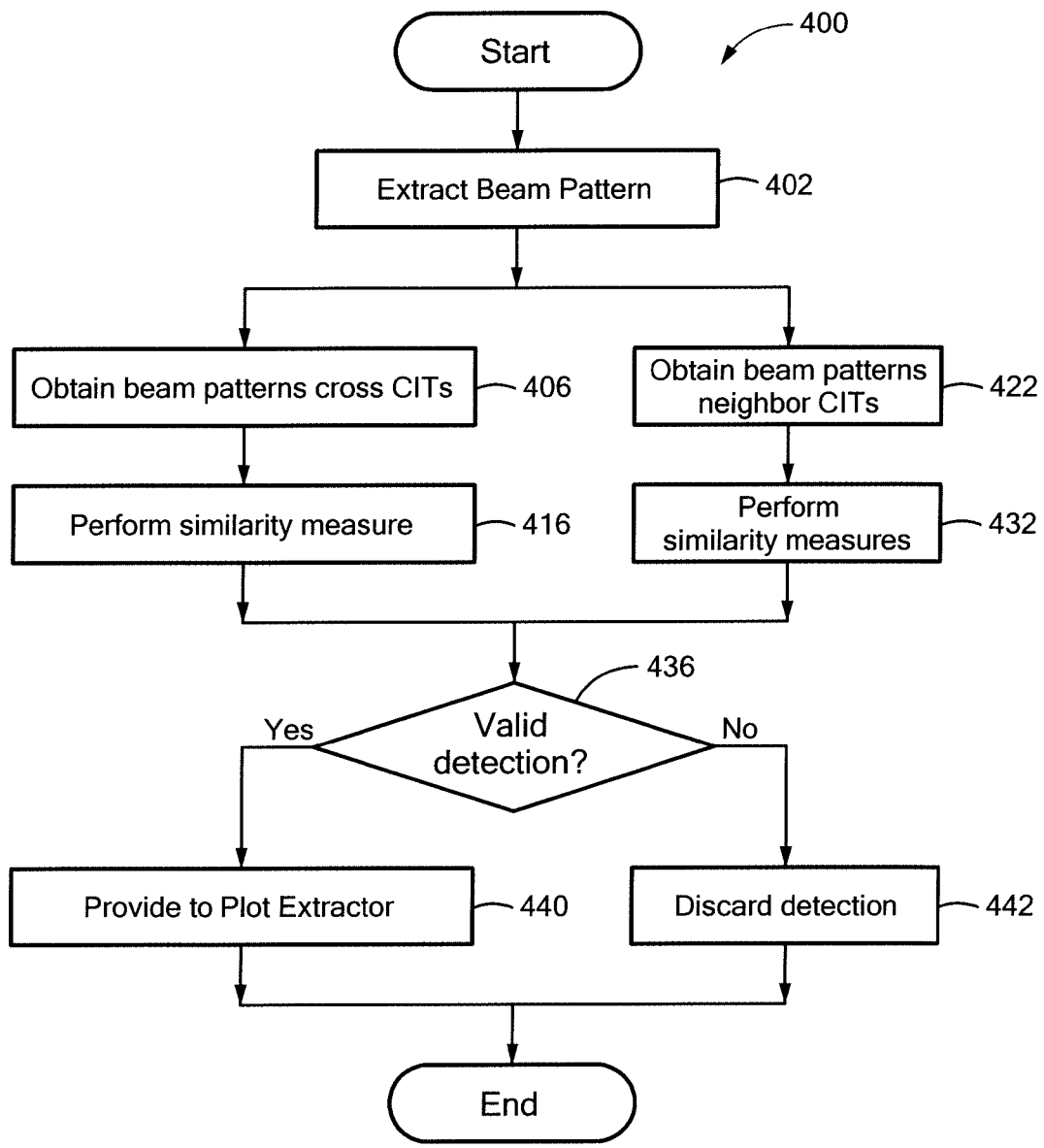
FIG. 4 is a flowchart of an example of a process to perform a beam matching test.

Referring to FIG. 4, an example of a process to perform a beam matching test 340, for each detection, is a process 400.

Process 400 extracts beam patterns (402). process 400 obtains beam patterns for adjacent CITs (406) and performs a similarity measure (416). For example, beam pattern for times T, T−dt, and T+dt are obtained and a similarity measure is performed amongst the three patterns. The similarity measure or correlation measure may use say one of several techniques such as cross correlation coefficient, principal component analysis and so forth. In one particular example, a cross correlation coefficient is used where the output varies between 0 and 1 where 1 represents a perfect beam pattern match and 0 represents an orthogonal beam patterns.

Process 400 obtains beam patterns for neighbor CITs (422) and performs similarity measures (432). For example, beam patterns for neighboring cells at time T are obtained and a similarity measure is performed amongst the neighbor beam patterns at time T, beam patterns for neighboring cells at time T−dt are obtained and a similarity measure is performed amongst the neighbor beam patterns at time T−dt, and beam patterns for neighboring cells at time T+dt are obtained and a similarity measure is performed amongst the neighbor beam patterns at T+dt.

Process 400 determines if the detection is valid (436). For example, if any one of the similarity measures is below a predetermined threshold value, the detection is rejected.

Figure 5A:
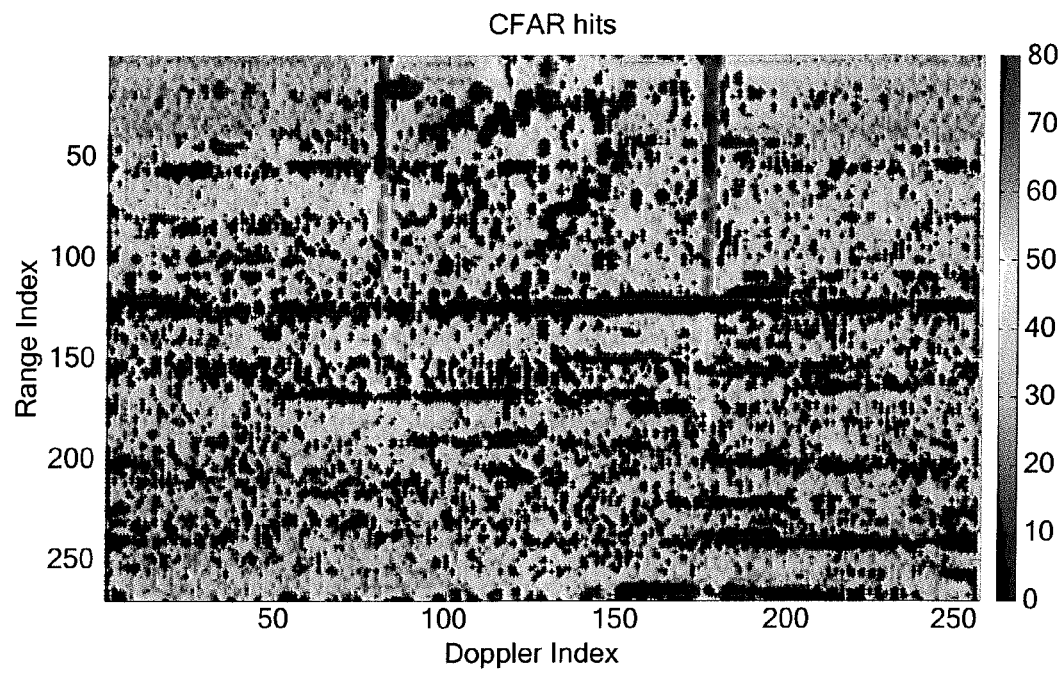
FIG. 5A is a plot of detections from a constant false alarm rate (CFAR) processor overlaid on a range-Doppler map.
Figure 5B:
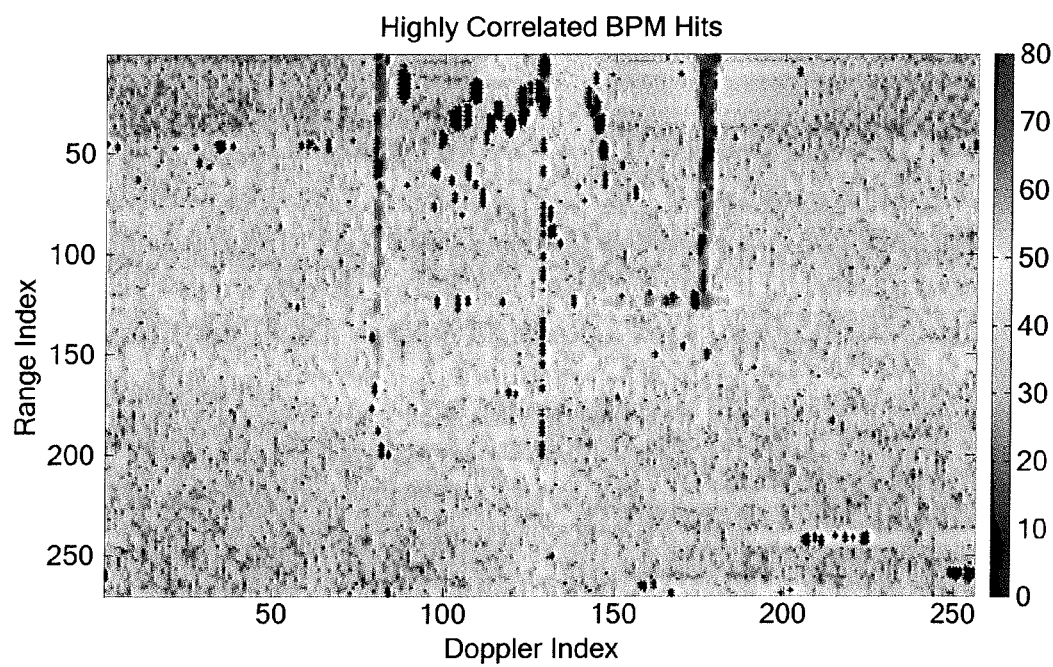
FIG. 5B is a plot of validated detections from the detection validator overlaid on a range-Doppler map.

If the detection is valid, process 400 provides the detection to the plot extractor 18 (440). If the detection is not valid, process 400 discards the detection (442). FIG. 5A shows the detections generated by the CFAR processor prior to performing a beam matching test (e.g., the process 400). FIG. 5B shows the validated detections after performing the beam matching test (e.g., the process 400).

Figure 6:
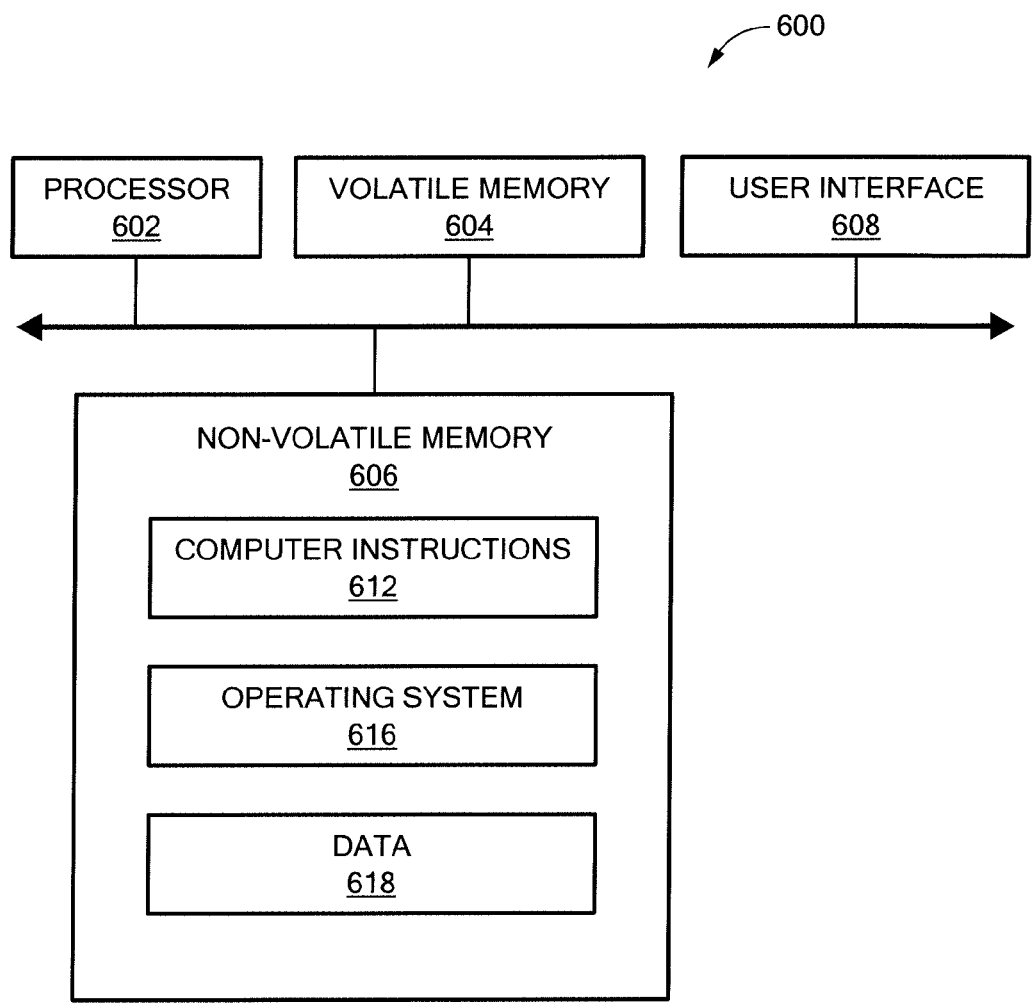
FIG. 6 is a computer on which the processes of FIGS. 3 and 4 may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 300 and 400).

The processes described herein (e.g., processes 300 and 400) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 and 400 are not limited to the specific processing order of FIGS. 3 and 4, respectively. Rather, any of the processing blocks of FIGS. 3 and 4 may be re-ordered, combined or removed, performed in parallel or in serial, as necessary, to achieve the results set forth above.

The processing blocks (for example, in the processes 300 and 400) associated with implementing the system may be performed by one or more programmable processors executing one or more computer programs to perform the functions of the system. All or part of the system may be implemented as, special purpose logic circuitry (e.g., and FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:

1. A method to identify and remove a false detection comprising:
receiving a detection from a constant false alarm rate (CFAR) processor;
performing a first similarity measure on adjacent coherent integration time values (CITs) corresponding to the detection;
performing a second similarity measure on neighbor CITs corresponding to the detection;
determining if at least one of the first or second similarity measure is below a threshold; and
discarding the detection if at least one of the first or second similarity measures is below the threshold.

2. The method of claim 1, further comprising:
receiving pulse data;
generating close CITs from the pulse data;
performing Doppler processing on the close CITs; and
generating beams from the Doppler processed data.

3. The method of claim 2, further comprising:
performing Doppler processing on the pulse data;
generating beams from the Doppler processed data; and providing the beams to an external interference cancellation (EIC) processor to remove interference; and
providing an output of the EIC processor to the CFAR processor.

4. The method of claim 1 wherein performing a first similarity measure on adjacent CITs corresponding to the detection comprises determining a similarity amongst a beam pattern at time T, a beam pattern at T−dt and beam pattern at T+dt.

5. The method of claim 1 wherein performing a second similarity measure on neighbor CITs corresponding to the detection comprises:
    determining a similarity amongst neighbor beam patterns at time T;
    determining a similarity amongst neighbor beam patterns at T−dt; and
    determining a similarity amongst neighbor beam patterns at T+dt.

6. The method of claim 1 wherein performing a first similarity measure on adjacent CITs corresponding to the detection comprises performing a cross correlation.

7. An apparatus, comprising:
    electronic hardware circuitry to identify and remove a false detection, the circuitry configured to:
        receive a detection from a constant false alarm rate processor (CFAR);
        perform a first similarity measure on adjacent coherent integration time values (CITs) corresponding to the detection;
        perform a second similarity measure on neighbor CITs corresponding to the detection;
        determine if at least one of the first or second similarity measures is below a threshold; and
        discard the detection if at least one of the first or second similarity measure is below the threshold.

8. The apparatus of claim 7 wherein the circuitry comprises at least one of a processor, a memory, programmable logic devices and logic gates.

9. The apparatus of claim 7, further comprising circuitry configured to:
    receive pulse data;
    generate close CITs from the pulse data;
    perform Doppler processing on the close CITs; and
    generate beams from the Doppler processed data.

10. The apparatus of claim 7, further comprising circuitry configured to:
    perform Doppler processing on the pulse data;
    generate beams from the Doppler processed data; and
    provide the beams to an external interference cancellation (EIC) processor to remove interference; and
    provide an output of the EIC processor to the CFAR processor.

11. The apparatus of claim 7 wherein the circuitry configured to perform a first similarity measure on adjacent CITs corresponding to the detection comprises circuitry configured to determine a similarity amongst a beam pattern at time T, a beam pattern at T−dt and a beam pattern at T+dt.

12. The apparatus of claim 7 wherein the circuitry configured to perform a second similarity measure on neighbor CITs corresponding to the detection comprises circuitry configured to:
    determine a similarity amongst neighbor beam patterns at time T;
    determine a similarity amongst neighbor beam patterns at T−dt; and
    determine a similarity amongst neighbor beam patterns at T+dt.

13. The apparatus of claim 7 wherein the circuitry configured to perform a first similarity measure on adjacent CITs corresponding to the detection comprises circuitry configured to perform a cross correlation.

14. An article comprising:
    a non-transitory medium that stores executable instructions to identify and remove a false detection, the instructions causing a machine to:
        receive a detection from a constant false alarm rate processor (CFAR);
        perform a first similarity measure on adjacent coherent integration time values (CITs) corresponding to the detection;
        perform a second similarity measure on neighbor CITs corresponding to the detection;
        determine if at least one of the first or second similarity measures is below a threshold; and
        discard the detection if at least one of the first or second similarity measure is below the threshold.

15. The article of claim 14, further comprising instructions causing the machine to:
    receive pulse data;
    generate close CITs from the pulse data;
    perform Doppler processing on the close CITs; and
    generate beams from the Doppler processed data.

16. The article of claim 14, further comprising instructions causing the machine to:
    perform Doppler processing on the pulse data;
    generate beams from the Doppler processed data; and
    provide the beams to an external interference cancellation (EIC) processor to remove interference; and
    provide an output of the EIC processor to the CFAR processor.

17. The article of claim 14 wherein the instructions causing the machine to perform a first similarity measure on adjacent CITs corresponding to the detection comprises instructions causing the machine to determine a similarity amongst a beam pattern at time T, a beam pattern at T−dt and a beam pattern at T+dt.

18. The article of claim 14 wherein instructions causing the machine to perform a second similarity measure on neighbor CITs corresponding to the detection comprises instructions causing the machine to:
    determine a similarity amongst neighbor beam patterns at time T;
    determine a similarity amongst neighbor beam patterns at T−dt; and
    determine a similarity amongst neighbor beam patterns at T+dt.

19. The article of claim 14 wherein instructions causing the machine to perform a first similarity measure on adjacent CITs corresponding to the detection comprises instructions causing the machine to perform a cross correlation.

* * * * *